B. R. BONNEY.
POULTRY PERCH.
APPLICATION FILED MAR. 11, 1912.
1,087,079.
Patented Feb. 10, 1914.
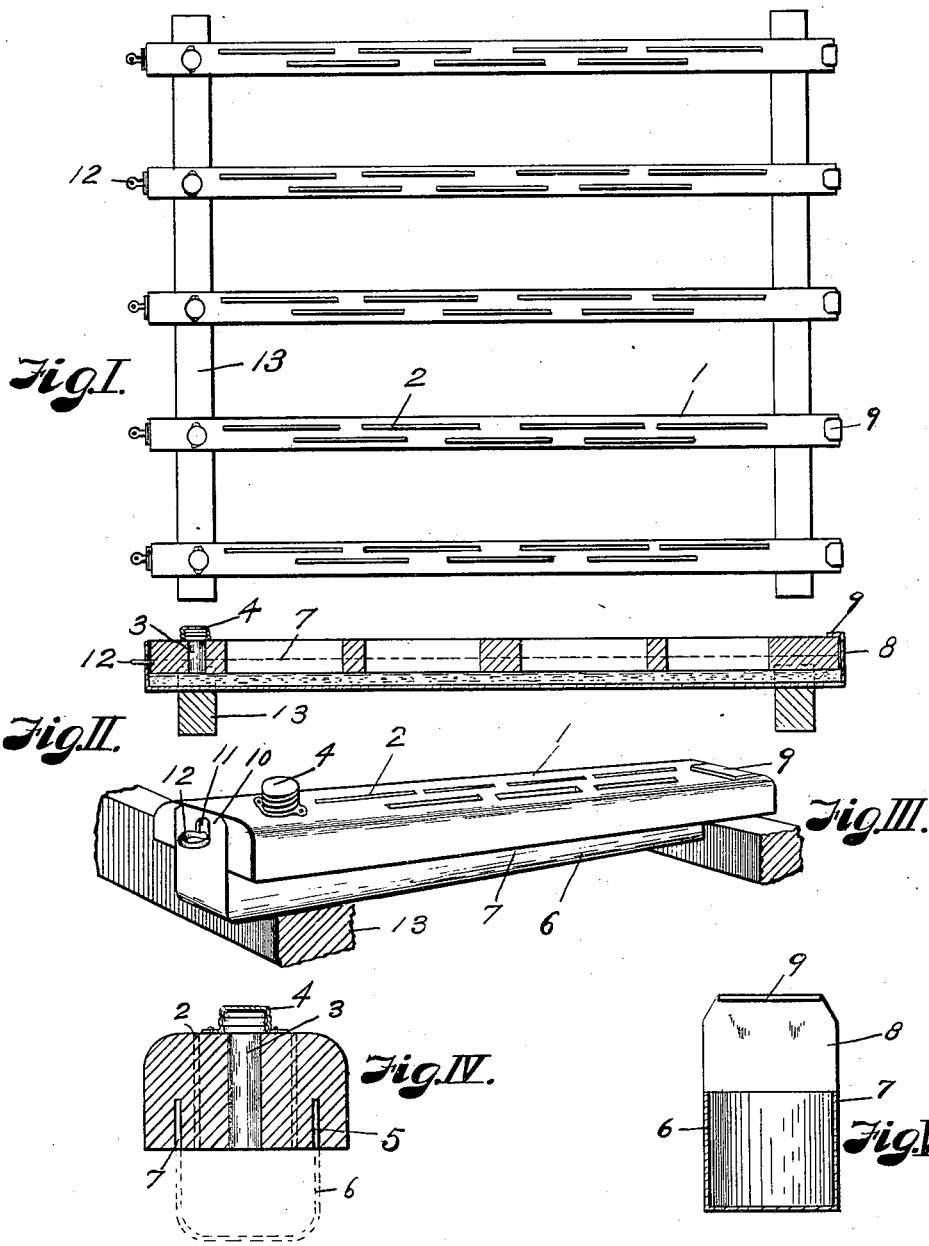
WITNESSES:
INVENTOR
Bick R. Bonney.
BY
ATTORNEY

UNITED STATES PATENT OFFICE.

BICK R. BONNEY, OF KANSAS CITY, MISSOURI, ASSIGNOR, BY DIRECT AND MESNE ASSIGNMENTS, TO J. EDWARD CHARBONEAU, OF KANSAS CITY, MISSOURI.

POULTRY-PERCH.

1,087,079.

Specification of Letters Patent.

Patented Feb. 10, 1914.

Application filed March 11, 1912. Serial No. 682,991.

*To all whom it may concern:*

Be it known that I, BICK R. BONNEY, a citizen of the United States, residing at Kansas City, in the county of Jackson and State of Missouri, have invented certain new and useful Improvements in Poultry-Perches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to poultry perches, and more particularly to a type, wherein the perch bars are of individual construction, and provided with independent reservoirs, adapted for the storage of germicide, exterminating fumes from which are communicated to the fowls during the period that they are at roost.

The principal object of my invention is to provide a device, which will exterminate vermin on the fowls and around the roosts and trap the unkilled vermin as they seek cover after leaving the fowls.

A further object of my invention is to provide a roost bar comprising separate base and reservoir members which may be easily disconnected to facilitate cleaning.

In accomplishing these objects, I have provided the improved details of structure, hereinafter described and illustrated in the accompanying drawings, wherein:—

Figure I is a plan view of a roost, comprising a number of my improved perch bars. Fig. II is a central longitudinal section of one of the perch bars. Fig. III is a perspective view of one of the perch bars, showing the manner of mounting same in the roost bars. Fig. IV is a cross section of one of the perch bars, with its reservoir. Shown in dotted lines. Fig. V is a cross section of the reservoir.

In Fig. I I have shown a number of the perch bars mounted on suitable supports to illustrate one manner in which they may be assembled, but I do not wish to be understood as limiting myself to any particular combination, as it is my purpose to manufacture the perch bars and sell same individually, allowing the purchaser to mount the bars as desired.

Referring more in detail to the parts, 1 designates the base member or body of the bar which is usually made of wood, and has longitudinal slots 2 therein, said slots being preferably staggered throughout the length of the bar, as with a single slot extending substantially throughout the length of the bar, the latter would tend to split or the slot to open wider than is desired. In one end of the bar is an aperture 3 through which the reservoir, presently described, may be filled, and which is preferably covered by a screw cap 4. In the under face of the bar are grooves 5 for receiving the sides of the reservoir, as will presently be described. The reservoir comprises a tank or trough, 6 of the same length as the perch base, and is preferably formed of sheet metal and of such width that the upper edges of the sides 7 will project into the base grooves 5. At one end of the reservoir is a lip 8 which projects above the trough body and has an ear 9 at the top adapted for projection over the end of the base (Fig. III). At its other end, the reservoir has a lip 10, provided with an aperture 11 through which a ring bolt 12 is projected into the end of the base 1 to fasten the reservoir to the perch base to provide means for hanging the combined bar, or assembling a number of the bars together. For assembling a number of perch bars, or roost bars 13, as shown in Fig. I, the roost bars are grooved laterally to receive the reservoir so that the latter may be nested therein, and the bases of the perch bars seated flush on the top of the roost bars.

Presuming the perch bars to be constructed as described, a number of the latter may be assembled in a compact package and shipped to a purchaser who may construct the roost to fit his poultry house. In assembling the bars with the roost, the reservoirs are attached to the base members and seated on the roost bars preferably as illustrated in the drawings. The reservoirs are then filled with germicide through the base apertures 3 so that when fowls perch thereon fumes from the germicide will rise through the staggered slots 2 to reach vermin on the bodies of the fowls.

It is apparent that the reservoirs may be replenished as often as necessary without removing the perch bars from the roost, but when desired the perch bars may be easily removed and the reservoirs removed from the base members by unscrewing the ring bolts.

Having thus described my invention, what I claim as new therein and desire to secure by Letters-Patent is:

1. A perch bar for fowls, comprising a wooden tread and a reservoir member, said tread member having a portion of its base projecting into the reservoir, lips on said reservoir for engaging the ends of said tread member, one of said lips having an ear adapted for projection over one end of said tread member and the other of said lips having an aperture therein, and a ring bolt on said tread member, adapted for projection through the lip aperture.

2. In a poultry perch, a bar comprising a reservoir and a tread member, having a slotted portion projecting into the said reservoir, and a capped aperture through which the reservoir may be filled, said tread member being provided with an end bolt and the reservoir with end lips, one of said lips having an ear adapted for projection over the end of the bar member and the other lip being apertured for the reception of the said bolt.

3. In a poultry perch, a bar comprising a reservoir and a tread member having a slotted portion projecting into the reservoir, and a capped aperture for filling the reservoir, said tread member being provided with an end bolt and the reservoir with an apertured lip at one end, and with a lip having an ear at the opposite end, the said lips and ear being adapted for engagement with the ends and top of said bar, and the bolt being adapted for passing through the lip aperture for securing the members together.

4. In a poultry perch, a bar comprising a reservoir and a tread member having grooves on its under face for receiving the edges of the reservoir, and having a series of longitudinally extended slots communicating with the reservoir, a ring bolt pivotally mounted in one end of said bar, lips disposed on the opposite ends of said reservoir, one of said lips being apertured for the reception of the ring bolt and the other of said lips having an ear projecting over the end of said bar, and a capped aperture on said bar member for filling the reservoir.

In testimony whereof I affix my signature in presence of two witnesses.

BICK R. BONNEY.

Witnesses:
LETA E. COOTS,
W. W. BUDD.

Copies of this patent may be obtained for five cents each, by addressing the "Commissioner of Patents, Washington, D. C."